(12) United States Patent
Djordjevic

(10) Patent No.: US 7,984,355 B2
(45) Date of Patent: Jul. 19, 2011

(54) MEMORY MODULE WITH RANKS OF MEMORY CHIPS

(75) Inventor: Srdjan Djordjevic, Münich (DE)

(73) Assignee: Qimonda AG, Munich (DE)

( * ) Notice: Subject to any disclaimer, the term of this patent is extended or adjusted under 35 U.S.C. 154(b) by 1135 days.

(21) Appl. No.: 11/697,792

(22) Filed: Apr. 9, 2007

(65) Prior Publication Data

US 2008/0250292 A1    Oct. 9, 2008

(51) Int. Cl.
*G06F 11/00* (2006.01)
*H04L 1/00* (2006.01)
*G08C 25/00* (2006.01)
*H03M 13/00* (2006.01)

(52) U.S. Cl. ........... 714/746; 365/51; 365/63; 365/221

(58) Field of Classification Search .............. 714/746; 365/51, 63, 221
See application file for complete search history.

(56) References Cited

U.S. PATENT DOCUMENTS

| 7,320,100 B2 * | 1/2008 | Dixon et al. ................ 714/758 |
| 2005/0047250 A1 | 3/2005 | Ruckerbauer et al. |
| 2006/0171247 A1 | 8/2006 | Hoppe et al. |
| 2006/0187756 A1 | 8/2006 | Ho et al. |
| 2007/0058408 A1 * | 3/2007 | Ruckerbauer et al. ......... 365/63 |

* cited by examiner

*Primary Examiner* — Guy J Lamarre
(74) *Attorney, Agent, or Firm* — Edell, Shapiro & Finnan, LLC

(57) ABSTRACT

A memory module includes a plurality of memory devices and a stacked error correction code memory device. The plurality of memory devices includes one or more memory chips arranged in a plurality of ranks. The stacked error correction code memory device includes a plurality of error correction code memory chips. The number of error correction code memory chips is at least one more than the number of the one or more memory chips. Each of the error correction code memory chips are arranged together with the memory chips of one of the ranks.

19 Claims, 6 Drawing Sheets

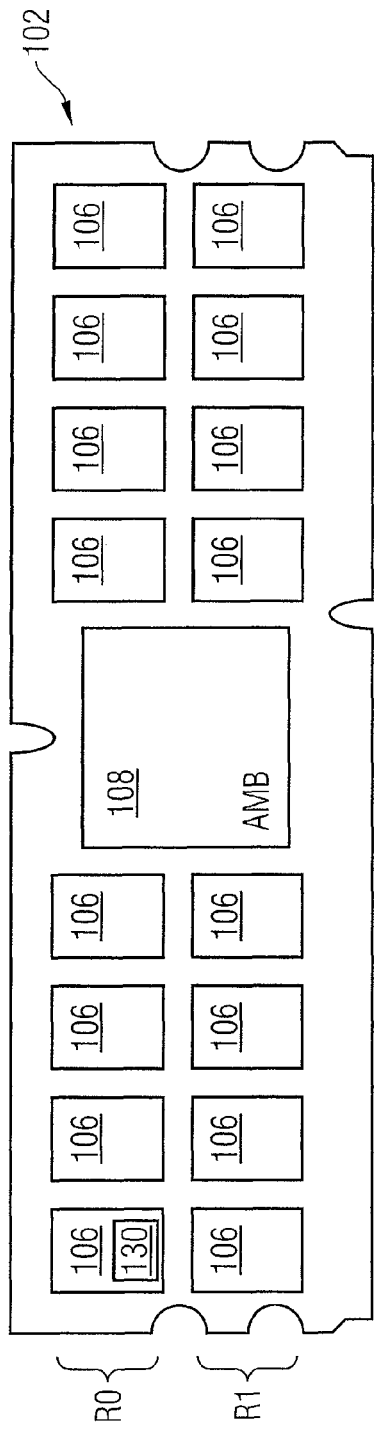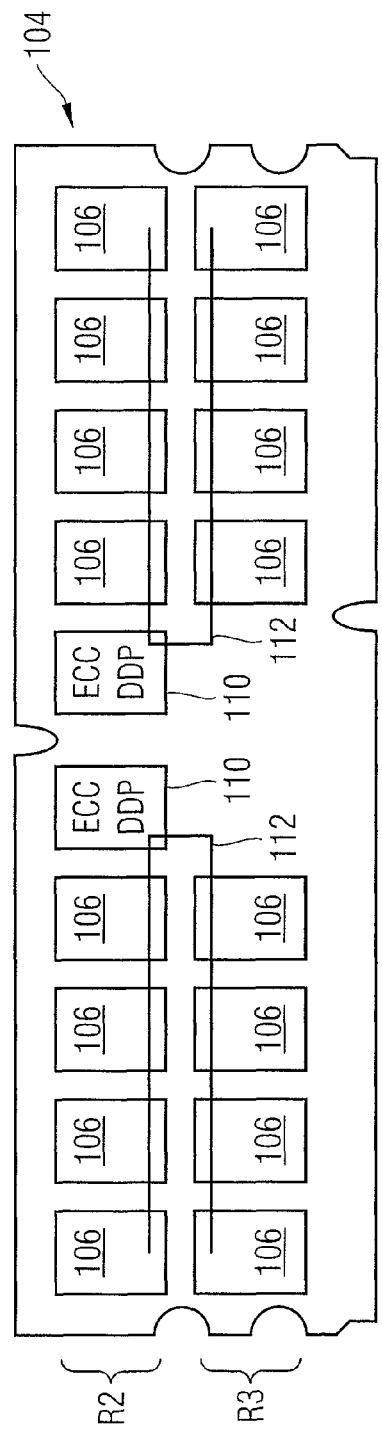

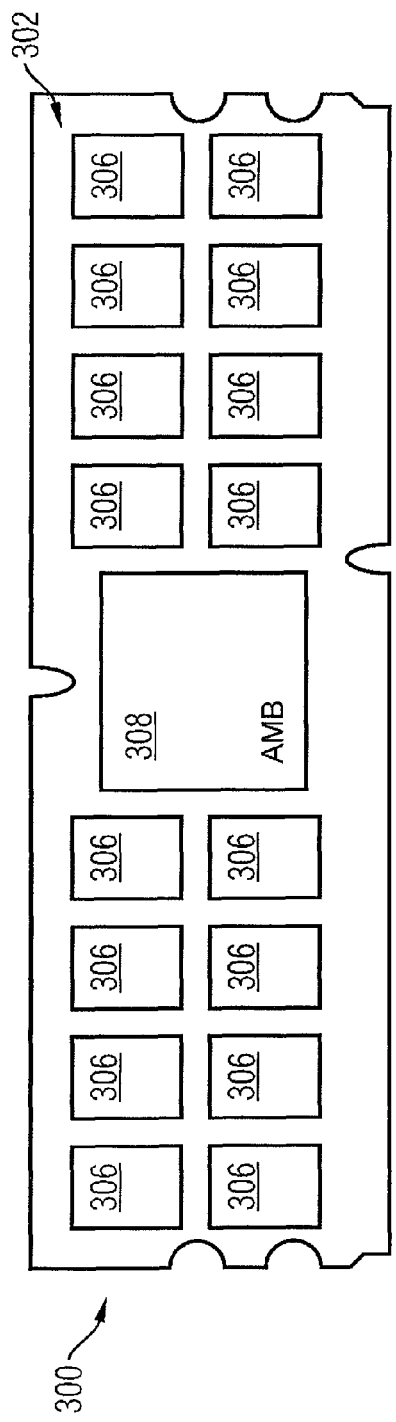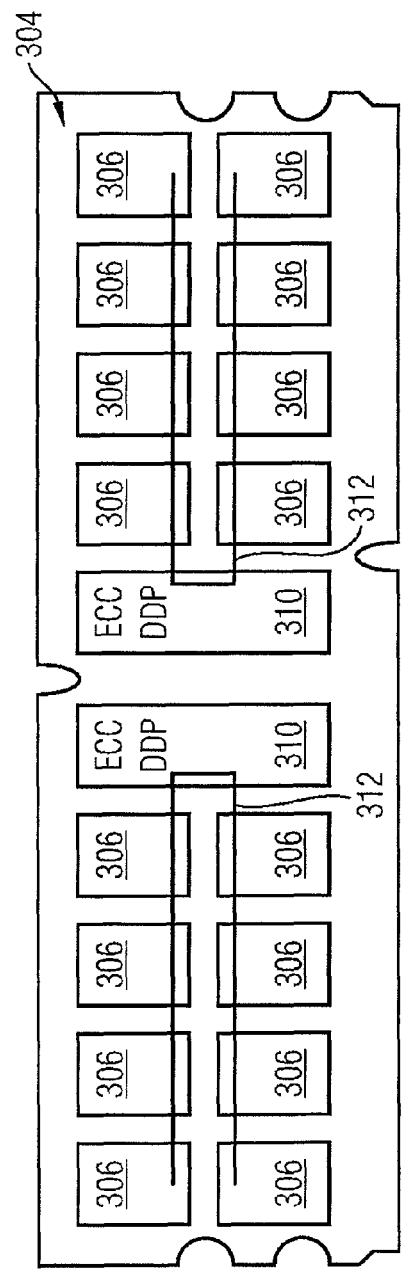

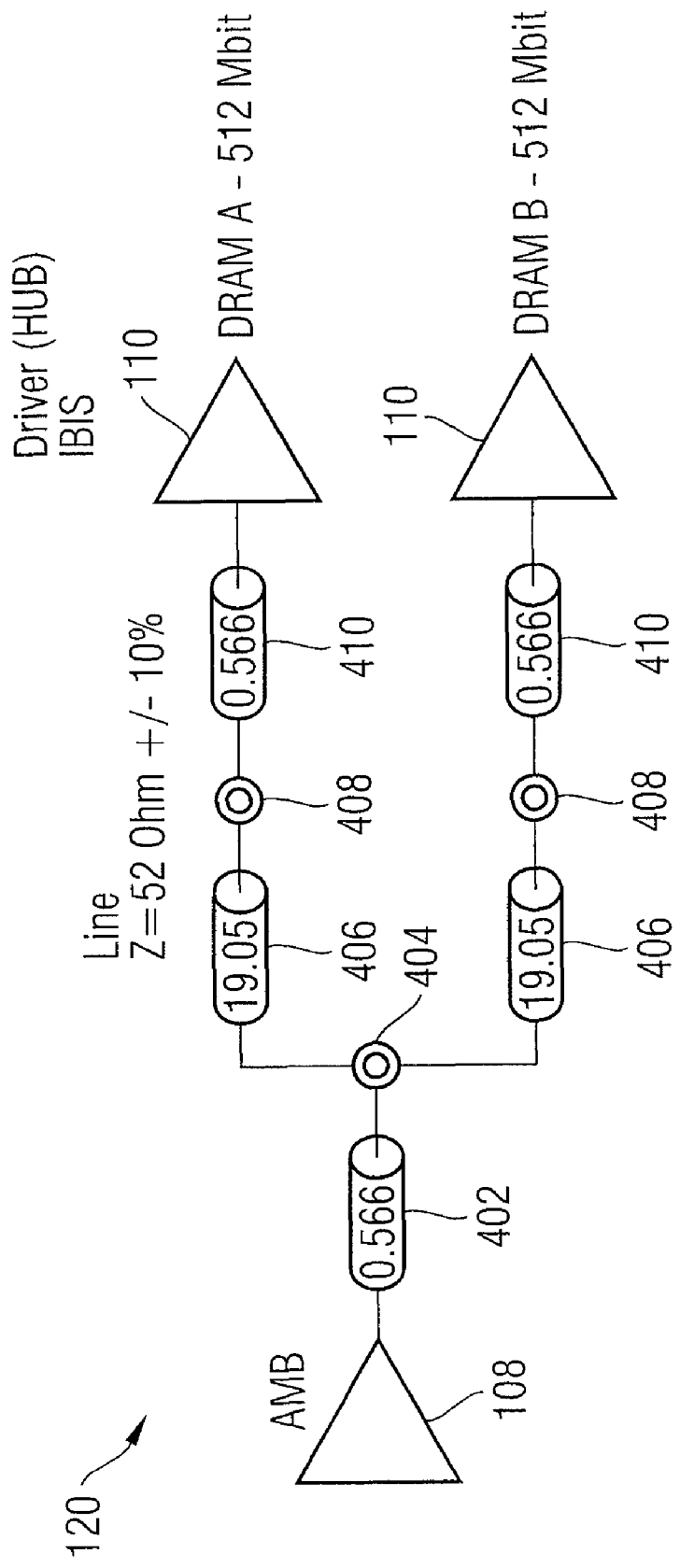

MEMORY MODULE WITH RANKS OF MEMORY CHIPS

BACKGROUND

In computer systems random access memories (RAM) are often organized in memory ranks, a term that was created by JEDEC (Joint Electron Device Engineering Council), the memory industries standards group. The concept of memory ranks applies to all memory modules form factors, including desk top DIMMs (dual in-line memory modules), notebook SODIMM (small outline dual in-line memory module), workstation and server registered DIMMs or fully-buffered DIMMs (FB-DIMMs). A memory rank is a block or area of data that is created using some or all of the memory chips on a memory module. Data bus lines connect the memory chips of the memory ranks and carry the input and output signals for read and write operations of the memory module. For such memory modules, it is desirable to have error correction capabilities with enhanced signal integrity.

SUMMARY

A memory module includes a plurality of memory devices and a stacked error correction code memory device. The plurality of memory devices includes one or more memory chips arranged in a plurality of ranks. The stacked error correction code memory device includes a plurality of error correction code memory chips. The number of error correction code memory chips is at least one more than the number of the one or more memory chips. Each of the error correction code memory chips are arranged together with the memory chips of one of the ranks.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 2a shows schematically a top side of the embodiment of a memory module;

FIG. 2b shows schematically a bottom side of the embodiment of a memory module;

FIG. 3a shows schematically the top side of a further embodiment of a memory module;

FIG. 3b shows schematically the bottom side of the further embodiment of a memory module;

FIG. 4 shows a network diagram of a routed data bus;

In the specification and the drawings, the same or like reference numerals are assigned to the substantially same components to avoid redundancy in the description.

DETAILED DESCRIPTION

Figure 1:
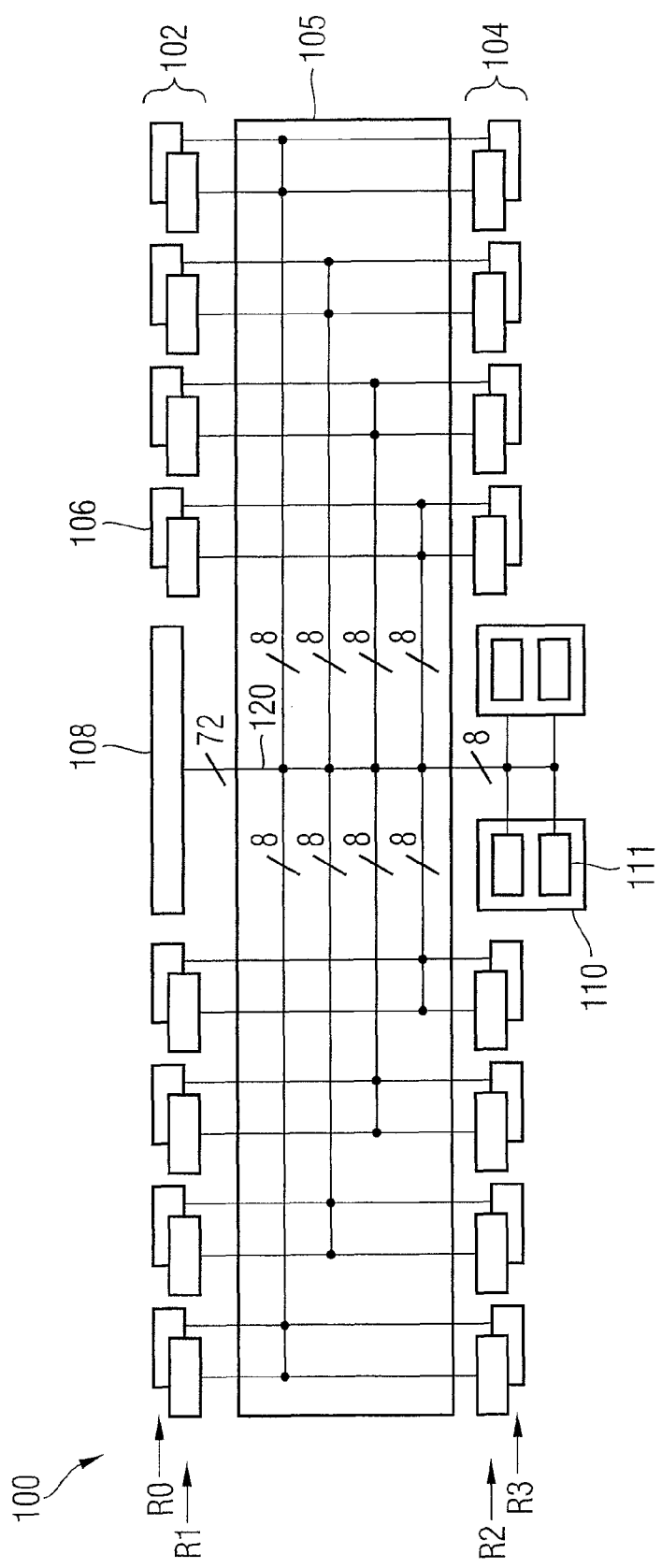
FIG. 1 shows schematically an embodiment of a memory module with data bus lines.

In FIG. 1, a memory module 100 is schematically depicted with a top side 102 and a bottom side 104. The wording "top" and "bottom" is not used restrictively, but simply chosen for purposes of easier description. In this regard, directional terminology such as "top", "bottom", etc. is used with reference to the orientation of components being described in the figures. Because components of the embodiments of the present invention can be positioned in a number of different orientations, the directional terminology is used for purposes of illustration and is no way limiting. The memory module 100 comprises a pc-board 105, on which a plurality of non-stacked memory chips 106 is placed. The memory chips 106 are organized in four ranks R0, R1, R2, and R3, whereby each rank R0, R1, R2, R3 comprises eight memory chips 106.

Such memory chips 106 may be, but are not restricted to, dynamic random access memories (DRAM). Other memory chips may be SRAMs (Static random access memories) or flash memories.

Memory modules 100, as depicted in FIG. 1, are often referred to as "Dual Inline Memory Modules (DIMM)". Other memory module schemes may be notebook SODIMM (small outline dual in-line memory modules).

In FIG. 2a, the top side 102 of the memory module 100 is shown schematically in a plan view and in FIG. 2b the bottom side 104 of the memory module 100 is schematically depicted in a plan view.

On the top side 102 a memory buffer device 108 is placed, which is used to act as an Advanced Memory Buffer (AMB). The memory buffer device 108 can compensate for signal deterioration by buffering and resending signals.

The memory buffer device 108 may be connected to the memory chips 106 via a plurality of bus systems (not all are depicted in FIGS. 1, 2a and 2b), e.g., a data bus (DQ), a command/address bus (CA), a Chip Select Bus (CS), a clock bus (CLK).

The memory chips 106 are of a non-stacked type, i.e., only one chip is included into the memory chips 106. A total of 16 memory chips 106 are present on the top side 102, organized into two ranks R0, R1.

A rank can be 64-bits of data wide, on memory modules which support error correction code (ECC); the 64-bit wide data area may have an 8-bit wide ECC area for a total width of 72-bits (see FIG. 1). Depending on how memory modules are configured, a memory module can contain one, two or four areas/ranks of 64-bit wide data areas (or 72-bit wide areas/ranks, where 72 bits=64 data bits and 8 ECC bits).

On the bottom side (see FIG. 2b) there are placed as well 16 non-stacked memory chips 106 and additionally two stacked error correction code (ECC) memory devices 110, each of the stacked error correction code memory devices 110 comprises two memory chips 111 (depicted in FIG. 1). A stacked memory device with two dies is also referred to as dual die package (DDP). Each of the error correction code memory devices 110 is connected via a data bus 120 (depicted in FIG. 1) to the memory buffer device 108. In this embodiment each of the memory chips 111 within the stacked error correction code memory device 110 is organized together with the memory chips 106 of one rank. The data within one of the memory chips 111 is used to correct errors in the memory chips 106 of the corresponding rank. It is also possible to use the same data bus lines (seventy-two data bus lines in an eight-bit-wise organization) for writing/reading data to/from memory chips 106 of different ranks. In this embodiment there would be used a chip-select signal to indicate to the memory chips 106 and to the error correction code memory chips 111, which rank R0, R1, R2, R3 is actually addressed and so a content of the corresponding memory chips 106 and error correction code memory chips 111 of this actually addressed rank R0, R1, R2, R3 can be written or read.

When using error correction code memory devices 110 with a memory capacity of 512 Mbit for each memory chip 111 inside the memory device 110 and a memory capacity of 512 Mbit for each memory chip 106 on the memory module 100, and a 8 bit wide data bus is used, then a 4R×8-configuration, i.e., a four rank by 8 bit organization is achieved, giving a total memory capacity of around 2 GByte for the depicted memory module 100. According to the JEDEC standard, a memory module with a similar component placement of the memory chips, but organized in 2R×4 configuration, would be referred to as FB-DIMM according to Industry Standard RC H ("Raw Card H"). With memory chips 106 having a memory capacity of 1 Gbit each a memory module 100 with a 4 GByte memory capacity would be achieved. Higher memory capacity of memory chips 106 would result in higher overall memory capacity of the memory module 100.

In FIG. 2b, there is also schematically depicted a routing for a command/address bus 112. The command/address bus 112 is connected to a corresponding pin (not depicted) of the memory buffer device 108 on the opposite surface of the pc-board 105 and then directly connected to the error correction code memory device 110, connecting both of the error correction code memory chips 111, which are stacked in the error correction code memory device 110. The command/address bus 112 is then routed like a fork to the upper and to the lower branch (e.g., in FIG. 2a the upper branch might be the left four memory chips of the third rank R2 and the lower branch might be the left four memory chips of the fourth rank R3). As usual the lower or upper branch of the command/address bus with this "fork-like" structure is terminated, respectively. As the error correction code memory device 110 on the left side of the memory module 100 is also connected via the command/address bus 112 to the memory chips 106, which are placed on the left side of the top side 102 of the memory module, the command/address bus 112 can be arranged in one of a plurality of connection layers within the pc-board 105.

Figure 5:
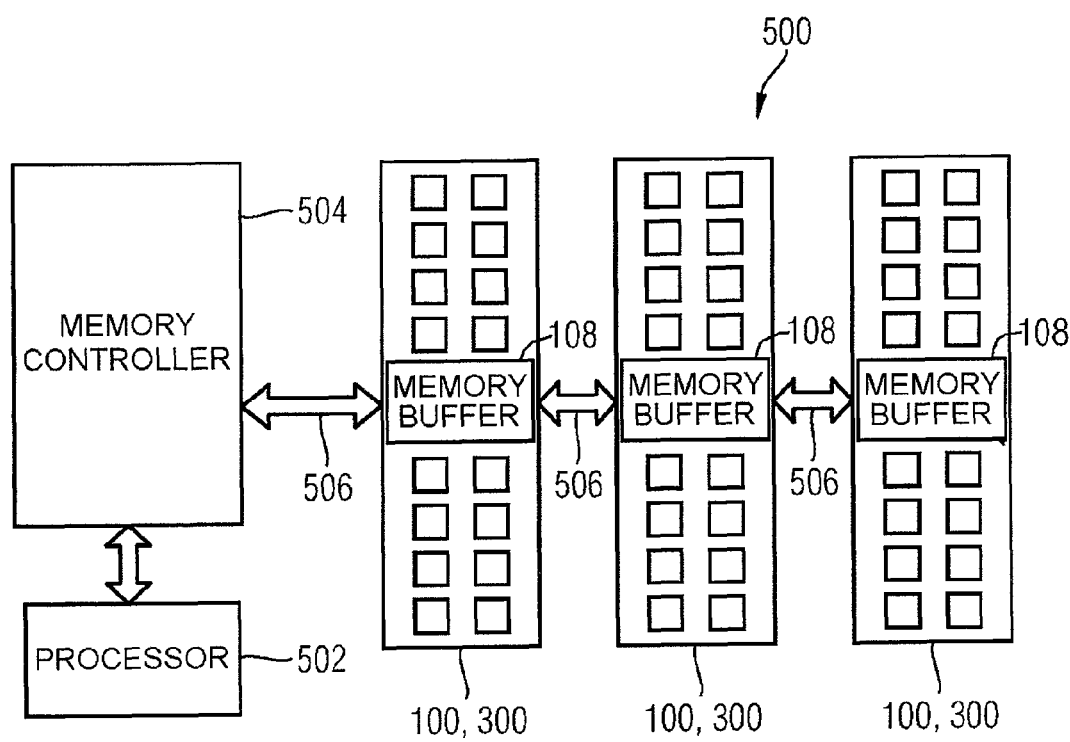
FIG. 5 shows schematically a computer system with a memory module.

For enhancing the signal integrity (SI) on data bus lines the memory chips 106 comprise on-die-termination (ODT) 130 (depicted only schematically in the most upper left memory chips 106 in FIG. 2a, it is to be understood that every memory chip 106 comprises an On-Die-Termination 130), which may be controlled via the memory buffer device 110 or by a memory controller 504 (e.g., as shown in FIG. 5).

In FIGS. 3a and 3b, a further embodiment of a memory module 300 is depicted. The structure of the memory chips 306 on a top side 302 and a bottom side 304 of a pc-board 305 is similar to the embodiment depicted in FIGS. 1, 2a and 2b. However, instead of two error correction code memory devices 110 with memory chips having the same memory capacity as the memory chips 106, in this further embodiment the two error correction code memory devices 310 comprise two memory chips with twice the memory capacity of the memory chips 306 (e.g., each memory chip inside the error correction code memory device 310 has 1 Gbit and the memory chips 306 each have 512 Mbit). The memory module 300 according to this further embodiment also works in situations in which half of the memory cells of the error correction code memory devices do not work, so that memory devices can be used, which otherwise would have been discarded due to insufficient memory capacity. A command/address bus 312 is depicted as well.

In FIG. 4, a network diagram for the data bus (DQ-Bus) 120 is depicted. From the memory buffer device (AMB) 108 a first stub 402 of 0.566 mm provides a connection to a first via 404. From the first via 404 two further stubs 406, each of 19.05 mm length, provides a connection to a second and third via 408, respectively, the second and third via 408 providing a connection to two additional stubs 410, each of which 0.566 mm of length. The two additional stubs 410 connect to the two stacked error correction code memory devices 110 of the embodiment depicted in FIGS. 2a and 2b, with two times 512 Mbit memory chips, which is depicted here, for example.

Since the two stacked memory chips 111 within one error correction code memory device 110 (or 310) are so closely situated ("stacked") the short distance between the two memory chips 111 within the error correction code memory device 108 hardly influences the network diagram, so that the signal integrity (SI) is hardly influenced as well.

Since the signal integrity (SI) is hardly influenced by the additional memory chips within the error correction code memory device 108, 308, it is possible to switch-off an on-die-termination 130 (depicted schematically in FIG. 2a, 2b) for the data bus 120 when reading data from the memory chips 106, 306 and only using the on-die-termination 130 when writing data to the memory chips 106, 306.

In FIG. 5, a computer system 500 is schematically depicted using memory modules 100, 300 as proposed. The computer system 500 comprises a processor 502 connected to a memory controller 504. The memory controller 504 is connected via a bus system 506 with a plurality of memory modules 100, 300 in a serial manner, so that an FB-DIMM architecture is achieved. With this architecture, the memory controller 504 writes to the memory chips 106 via the memory buffer device 108. The memory buffer device 108 can compensate for signal deterioration by buffering and resending signals.

Figure 6:
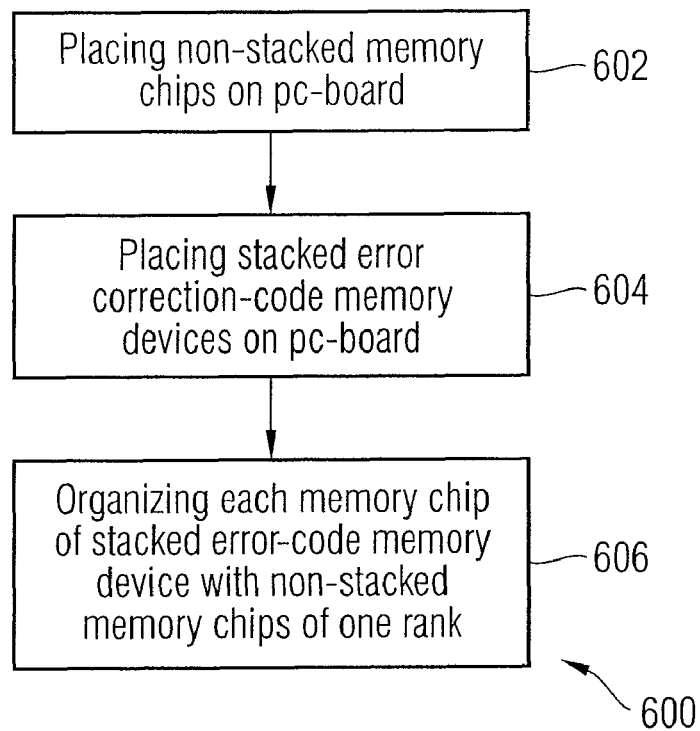
FIG. 6 shows schematically a diagram with features of manufacturing a memory module.

In FIG. 6, a block diagram 600 illustrates features for manufacturing a memory module. During a first step 602 a plurality of non-stacked memory chips is placed onto a pc-board, the memory chips being organized into a plurality of ranks. In a further step 604 a stacked error-correction code memory device comprising at least two error correction code memory chips is placed onto the pc-board and each of the at least two error correction code memory chips is organized together with the non-stacked memory chips of one of the ranks in a further step 506.

Figure 7:
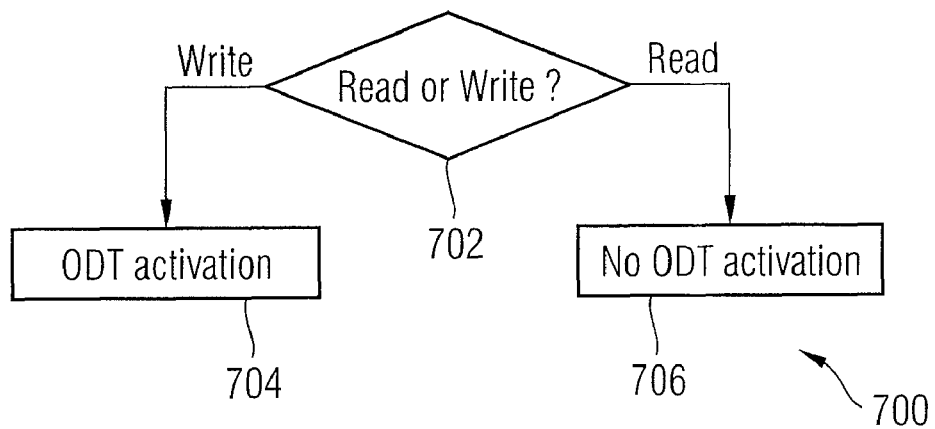
FIG. 7 shows schematically a diagram with features of operating a memory module.

In FIG. 7, a block diagram 700 is schematically depicted for a method of operating a memory module. The method checks in a first step 702, whether a read or write procedure is to be effected. In case of a write procedure the on-die-termination is activated in step 704, in case of a read procedure no on-die-termination is activated in step 706.

Within the embodiments stacked error correction code memory devices with two stacked memory chips are disclosed. However, more than two stacked memory chips, (e.g., three of four) is known to one of ordinary skill in the art and likewise can be used as well. So, for example, quad dies (meaning stacked devices with four dies or four memory chips) can be used as error-code correction devices, for instance, together with non-stacked memory chips, so that one quad stacked error-code correction device is placed onto a pc-board together with four ranks of memory chips, each of the four memory chips stacked in the quad stacked error-code correction device being organized together with the memory chips of one of the four ranks.

In memory modules with stacked memory devices (e.g., dual dies packages) for storing the actual data it is possible to use quad stacked error-code correction devices with four memory chips, each of the memory chips of the quad stacked error-code correction device being organized together with memory chips of one rank. Each of the stacked memory devices for storing the actual data may comprise two memory chips of different ranks.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed:

1. A memory module, comprising:
    a plurality of memory chips arranged in a plurality of ranks; and
    a stacked error correction code memory device comprising a plurality of error correction code memory chips, each of the error correction code memory chips being arranged together with the memory chips of one of the plurality of ranks;
    wherein the number of error correction code memory chips is greater than the number of ranks of memory chips.

2. The memory module according to claim 1, wherein the plurality of memory chips comprise non-stacked memory chips arranged in a plurality of ranks.

3. The memory module according to claim 2, further comprising:
    a memory buffer chip connected via data bus lines to the non-stacked memory chips and to the stacked error correction code memory device;
    wherein the error correction code memory chips are connected via the data bus lines to the memory buffer chip.

4. The memory module according to claim 3, wherein each of the non-stacked memory chips comprises an on-die-termination operable to be switched on via the memory buffer device in response to writing data into the respective memory chip.

5. The memory module according to claim 2, further comprising:
    a memory buffer chip; and
    a command/address bus routed from the memory buffer chip to the stacked error correction code memory device and from the stacked error correction code memory device to at least some of the memory chips.

6. The memory module according to claim 5, wherein each of the non-stacked memory chips comprises an on-die-termination operable to be switched on via the memory buffer device in response to writing data into the respective memory chip.

7. The memory module according to claim 2, wherein each of the error correction code memory chips has a higher memory capacity than each of the memory chips of one of the ranks.

8. The memory module according to claim 2, further comprising:
    a second stacked error correction code memory device;
    wherein each of the first and second stacked error correction code memory devices comprises two error correction code memory chips, the plurality of non-stacked memory chips comprise 32 8-bit-wide non-stacked memory chips arranged in four ranks and each error-code memory chip is arranged together with eight non-stacked memory chips of one of the four ranks.

9. The memory module according to claim 2, further comprising:
    a pc-board; and
    a memory buffer device;
    wherein the plurality of non-stacked memory chips, the stacked error correction code memory device and the memory buffer device are disposed on the pc-board, and the memory buffer device is connected to the non-stacked memory chips and to the stacked error correction code memory chips.

10. The memory module according to claim 9, further comprising:
    a command/address bus routed from the memory buffer device to the stacked error correction code memory device and from the stacked error correction code memory device to at least some of the non-stacked memory chips of the ranks.

11. The memory module according to claim 1, further comprising:
    a memory buffer chip connected via data bus lines to the memory chips and to the stacked error correction code memory device;
    wherein the error correction code memory chips are connected via the data bus lines to the memory buffer chip.

12. The memory module of claim 1, wherein each error code correction memory chip has a greater memory capacity than each memory chip arranged in a rank.

13. A method of providing a memory module, comprising:
    arranging a plurality of non-stacked memory chips on a pc-board, the memory chips being arranged in a plurality of ranks;
    arranging a stacked error correction code memory device comprising a plurality of error correction code memory chips on the pc-board; and
    arranging each of the error correction code memory chips together with the non-stacked memory chips of one of the ranks;
    wherein the number of error correction code memory chips is greater than the number of ranks of memory chips.

14. The method according to claim 13, further comprising:
    arranging a memory buffer chip on the pc-board; and
    connecting the memory buffer chip via data bus lines to the non-stacked memory chips and to the stacked error correction code memory device;
    wherein the error correction code memory chips are connected via the data bus lines to the memory buffer chip.

15. The method according to claim 13, further comprising:
    arranging a memory buffer chip on the pc-board; and
    routing a command/address bus from the memory buffer chip to the stacked error correction code memory chips and from the stacked error correction code memory chips to at least some of the non-stacked memory chips.

16. The method according to claim 13, wherein the plurality of non-stacked memory chips comprises 32 8-bit-wide non-stacked memory chips arranged in four ranks, and the method further comprises:
    arranging a further stacked error correction code memory device on the pc-board, wherein each of the stacked error correction code memory devices comprises two error-code memory chips; and
    arranging each error-code memory chip together with eight non-stacked memory chips of one of the ranks.

17. The method according to claim 13, wherein an on-die-termination is disposed within each of the memory chips, and the method further comprises:
    checking whether a read or write procedure is to be conducted for the memory module; and
    activating each on-die-termination only in response to writing data to a respective memory chip.

18. A computer system comprising:
    a processor;

a memory controller connected to the processor; and
at least one memory module, the at least one memory module comprising:
   a plurality of non-stacked memory chips arranged in a plurality of ranks; and
   a stacked error correction code memory device comprising a plurality of error correction code memory chips, each of the error correction code memory chips being arranged together with the non-stacked memory chips of one of the ranks, wherein the number of error correction code memory chips is greater than the number of ranks of memory chips.

19. The computer system according to claim 18, wherein the at least one memory module further comprises a memory buffer chip that is connected to the memory controller, the plurality of non-stacked memory chips, and the stacked error correction code memory device.

* * * * *